May 8, 1945.                P. MANNINO                    2,375,427

SHEET HOLDER AND POSITION INDICATOR

Filed July 21, 1943

Inventor
PHILIP MANNINO

By
Attorney

Patented May 8, 1945

2,375,427

UNITED STATES PATENT OFFICE 2,375,427

SHEET HOLDER AND POSITION INDICATOR

Philip Mannino, Bridgeport, Conn., assignor to Remington Rand Inc., Buffalo, N. Y., a corporation of Delaware Application July 21, 1943, Serial No. 495,666

1 Claim. (Cl. 33—1)

This invention relates to a sheet holder and position indicator particularly adapted to indicate the position of typewritten and similar matter on letter sheets and the like.

The invention provides a sheet holder and position indicator wherein a sheet of transparent material is provided with a portion folded upon itself to provide a fold at one edge of a top section of the sheet arranged to receive and position a printed, perforated or typewritten sheet with one edge positioned with respect to the top section by the fold portion so that the position of any material on the sheet placed in said holder can be readily determined by a scale provided on the top section of the sheet having graduations at spaced intervals throughout the surface of the top section for immediately indicating the position of the matter on the inserted sheet relative to the fold portion both vertically and horizontally. This holder facilitates the location of matter on printed and typed sheets and the like in a manner that makes it easy to reproduce a copy of the matter on the sheet on another sheet such as the master sheet used in spirit duplicating processes or on a stencil or other similar duplicating or printing process.

The invention comprehends the provision of both a vertical and horizontal scale formed of a plurality of marks in which the vertical and horizontal marks intersect one another at spaced intervals throughout the area of a holder sheet of transparent material so that both the vertical and horizontal position of typewritten matter on a sheet mounted in the holder and fixed with respect to a fold portion at one edge of the holder may be quickly determined in order that a copy of the sheet may be conveniently reproduced with the typewritten or similar matter in the same position in the copy as in the original.

Figure 1:
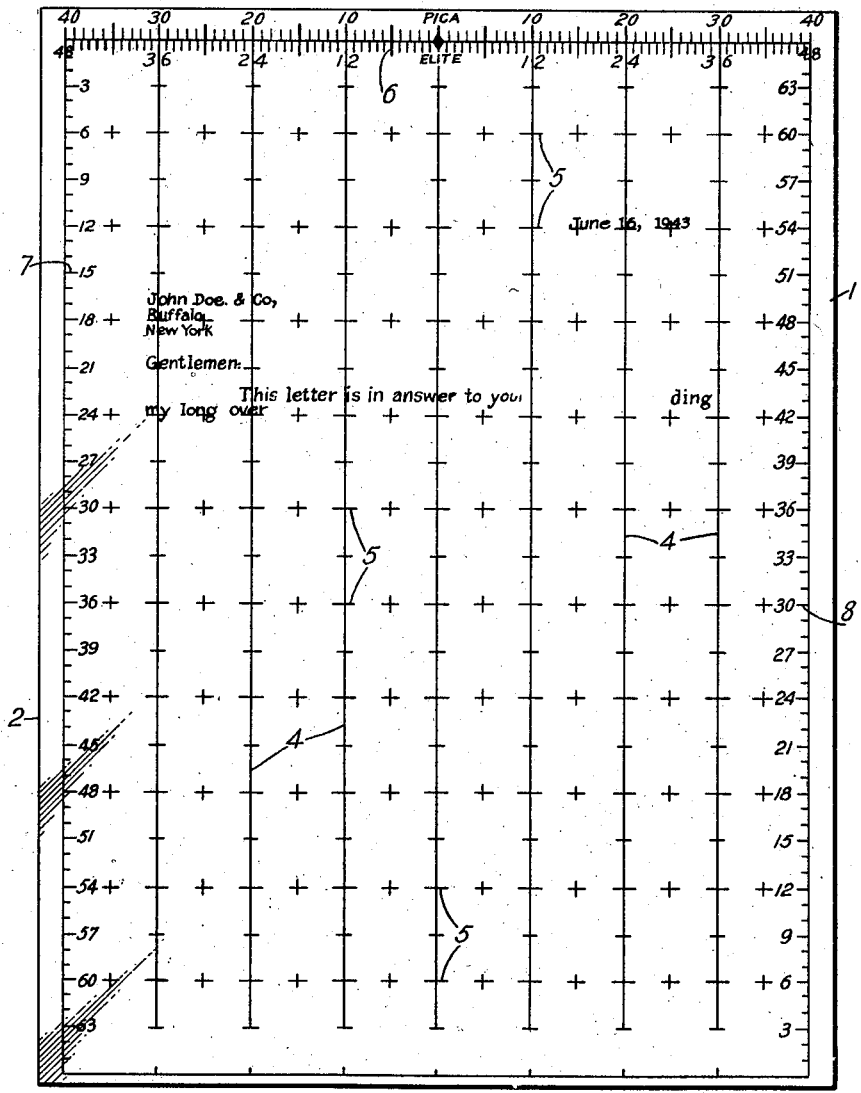
Fig. 1 is a plan view of the sheet holder and position indicator.
Figure 2:
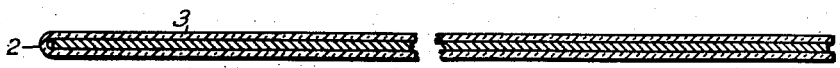
Fig. 2 is a cross-section taken on line 2—2 of Fig. 1.

A sheet of suitable transparent material, such as glassine paper, waxed paper, Cellophane, Celluloid and the like is used for the purpose of producing the holder of this invention. This sheet is indicated at 1 and is folded in any suitable manner to provide a straight transversely extending fold portion 2. The sheet may be formed to provide sections of equal size at opposite sides of the fold in order to provide a folder to receive a suitable letter sheet or the like therebetween. However, it is not necessary that the rear section of the folded sheet be of equal size to the top section 3 thereof.

Since this holder is particularly adapted for use in holding letter and legal sized sheets having typewritten matter thereon, the size of the top section 3 will usually be equal to either a letter or legal sized sheet, the drawing illustrating a holder having a size slightly larger than and for holding a letter sized sheet by way of example.

The top section 3 of the transparent holder is provided with a scale of the character illustrated in the drawing having a plurality of vertically extending marks 4 arranged in spaced parallel relation and distributed over the entire area of the top section. The scale also has a plurality of horizontal marks 5 also arranged to extend in spaced parallel relation between the top and bottom margins over substantially the entire area of the top section. Marks 4 and 5 are arranged so that they intersect at spaced intervals throughout the area of the sheet and thereby provide a scale having a plurality of marks for indicating the position on the sheet relative to fold portion 2 both vertically and horizontally of the folder.

Since this scale on the sheet is particularly adapted for use with typewritten matter on letters and the like, it is particularly designed to indicate typed character spacing crosswise of the sheet, the character spacing being indicated by numerals for both pica and elite type at the top of the top section as indicated at 6. Scale numerals indicating the line spacing are provided at both the left and right-hand edges of the top section as indicated at 7 and 8 respectively, the numeral 7 indicating the line scale designating the number of lines reading downwardly from the top, while 8 designates the numerals indicating the lines reading upwardly from the bottom. With the line scale at 8 it will be clear that the user can determine at a glance the number of lines any particular typed matter may be from either the bottom or the top of the sheet.

The sheet holder and position indicator is particularly adapted for holding sheets of typewritten matter that it is desired to reproduce by spirit duplicating process or by the usual well-known stencil duplicating process or other similar methods of reproducing intelligence. By placing a letter sheet or the like into the holder and jogging it into a position where one edge of the sheet is engaged in fold portion 2 throughout its length while another edge may be coincident with either the top or bottom edge of the holder, the position of typewritten matter on the sheet can then be readily read through the transparent top sheet. The positioning of all typewritten matter on the letter sheet is immediately indicated by the scale both in regard to the horizontal distance from the fold line and also the vertical distance from either the top or bottom of the holder. As a result a duplicate of this typewritten material on the sheet in the holder can be reproduced with the various portions thereof in the same position as on the original sheet. As shown in Fig. 1 the actual location of the address of the letter sheet can be speedily determined as well as the position of the first paragraph, the extent of indentation thereof and the line and paragraph arrangement of all of the other typewritten matter on the sheet. The position of drawings or sketches is indicated too by the same scale.

With a sheet holder of the character herein disclosed, the typing of a master sheet for a spirit duplicating process, stencil duplicating process or equivalent process can be produced in less time because the scale carried by the holder can be reproduced as a top print or the like on the master sheet for the spirit duplicating process or on a stencil or the like. All of the typewritten or drawn matter can be accurately located by means of the sheet holder of this invention in which the fold portion cooperates with the scale in providing for fixing and indicating the location of the printed matter.

The scale may be printed or etched on the sheet or formed by embossing, watermarking or in any other convenient or equivalent manner on the top section of the holder.

It is to be understood that in referring to the sheet material as being transparent, that it is contemplated that it may be fully or only partially transparent or in some cases opaque in order to serve the purpose of the present invention. It is only necessary that the sheet be sufficiently transparent that the typewritten or printed matter on a sheet inserted in the holder can be read through the holder sheet or top sheet and the use of the word transparent is to be understood to include all of these variations.

This sheet holder is either transparent, semi-transparent and even in opaque form may and is desirably employed for holding a master sheet for either spirit or gelatine duplicating purposes. When the master sheet is positioned in this holder, a copy of a letter or the like corresponding to an original held in another holder can be made in which the position of the typing on the copy will be the same as the original through using the duplicate indicating scales on the two holders.

Where a folded sheet is used as a master sheet by having one part coated with the transfer ink or the like, the provision of the scale on the top section of the folded master sheet, provides for the production of a master copy for duplicating purposes with the typewritten matter in the same position as on the original. The master copy sheet will be engaged in the fold of the master top printed sheet in the same manner as the letter sheet original is engaged in the fold as illustrated in the drawings, so that the master copy sheet can be held in fixed relation to the scale by the fold or can be suitably attached in fixed relation to one margin of a top section 3. A letter sheet or the like may also be attached to a margin of the top section 3 if desired for holding it firmly in position.

The invention claimed is:

A sheet holder and position indicator comprising a sheet of transparent material folded intermediate its ends to provide a locating fold portion and top and rear sections, said top section being of substantially rectangular shape with at least one edge extending in perpendicular relation to said locating fold, a scale inscribed on said top section along the marginal portion of said top section adjacent said perpendicular edge in perpendicular relation to said locating fold and indicating fixed measurements thereon from said locating fold, said scale having a plurality of appropriately designated cardinal points thereon, a second scale inscribed on said top section in parallel adjacent relation to said locating fold and having the scale graduations thereof arranged in fixed relation to and indicating fixed measurements from said perpendicular edge with a plurality of appropriately designated cardinal points thereon, and a plurality of line sections inscribed at spaced intervals throughout the area of said top section in right angular intersecting relation to indicate the points of intersection of line sections drawn from the cardinal points on both scales, whereby a typewritten sheet may be positioned in and held between the top and rear sections of said transparent sheet with one edge engaged in said locating fold and an adjacent edge in coincident relation with said perpendicular edge of said top section for registering type character and line space positions of all the typewritten matter on said typewritten sheet throughout the area of said top section.

PHILIP MANNINO.